United States Patent
Blair

(10) Patent No.: US 7,310,638 B1
(45) Date of Patent: Dec. 18, 2007

(54) METHOD AND APPARATUS FOR EFFICIENTLY PROCESSING QUERIES IN A STREAMING TRANSACTION PROCESSING SYSTEM

(75) Inventor: David A. Blair, Wayland, MA (US)

(73) Assignee: Metra tech, Waltham, MA (US)

(*) Notice: Subject to any disclaimer, the term of this patent is extended or adjusted under 35 U.S.C. 154(b) by 456 days.

(21) Appl. No.: 10/959,737

(22) Filed: Oct. 6, 2004

(51) Int. Cl.
*G06F 17/30* (2006.01)

(52) U.S. Cl. ............................................ 707/4; 707/3

(58) Field of Classification Search ............ 707/3
See application file for complete search history.

(56) References Cited

U.S. PATENT DOCUMENTS 6,560,606 B1 * 5/2003 Young ..................... 707/100
6,782,394 B1 * 8/2004 Landeck et al. .......... 707/104.1
6,934,727 B2 * 8/2005 Berkowitz et al. ........ 715/500.1

OTHER PUBLICATIONS

Hanlon et al. "Publish/Subscribe in NonStop SQL: Transactional Streams in a Relational Context", Data Engineering, 2004, pp. 821-824.*
Bei et al. "A Direct Method of Data Exchange Between XML and Relational Database", Information Technology Interfaces, 2004, vol. 1, pp. 127-132.*
Garcia et al. "Microsoft SQL Server TM 2000 Administrator's Companion", Microsoft Press, Sep. 27, 2000, Chapter 21 and 22.*
"XML—Extensibe Markup Language", Wikipedia, the free encyclopedia.*
Hanlon et al. "Publish/Subscribe in NonStop SQL : Transactional Streams in a Relational Context", Data Engineering, 2004, pp. 821-824.*
Bei et al. "A Direct Method of Data Exchange Between XML and Relational Database", Information Technology Interfaces, 2004, vol. 1, pp. 127-132.*
Garcia et al. "Microsoft SQL Server TM 2000 Administrator's Companion", Microsoft Press, Sep. 27, 2000, Chapter 21 and 22.*
"XML—Extensible Markup Language", Wikipedia, the free encyclopedia, last updated 2007.*

* cited by examiner

*Primary Examiner*—Pierre Vital
*Assistant Examiner*—Yuk Choi
(74) *Attorney, Agent, or Firm*—Law Offices of Paul E. Kudirka

(57) ABSTRACT

To efficiently process a parameterized query against a relational database in a streaming transaction processing system, the transaction stream is treated as a sequence of multi-record "chunks" and a single "quasi-batch" query is executed for each chunk. A specific table in the database holds the parameter values obtained from each transaction and the parameters are bound to the rest of the query by using a database join. Another embodiment uses a framework that automates the technique by accepting the parameterized query, identifying inputs and outputs, reading the stream for the parameter values and building the parameter table, converting the parameterized query into an equivalent query that contains a join against the parameter table, performing the equivalent query and inserting the resulting query values into the stream.

26 Claims, 6 Drawing Sheets

METHOD AND APPARATUS FOR EFFICIENTLY PROCESSING QUERIES IN A STREAMING TRANSACTION PROCESSING SYSTEM

FIELD OF THE INVENTION

This invention relates to streaming transaction processing environments and to methods and apparatus for efficiently executing data-driven queries against relational databases in such environments.

BACKGROUND OF THE INVENTION

In many streaming transaction processing systems, it is necessary to execute queries that are driven by values in the streaming data against a conventional relational database. For example, in a typical streaming environment, a stream of records or objects that contain various data fields arrives continuously at the transaction processing system. In order to process a typical transaction, it is necessary to execute a conventional SQL query for each record in the stream where inputs to the SQL query are taken from selected field values in that record. Also, in many cases, the output values from the SQL query will be placed back into fields of that record so that the record can be further processed downstream of the SQL query lookup. For example, a billing processing system many receive a constant stream of records that are the result of metering equipment operating in the field. It is often necessary to lookup a rate or other value for each record based on the values in some of the fields in the record, such as type and quality of service, service duration, etc. Once the rate is determined it is written into a rate field in the record so that the record can be further processed as a unit.

One simple mechanism for executing such a query is to execute a parameterized SQL statement against the database as each new record is received. For example, assume that the transaction processing system receives a stream (stream) of records wherein each record (record) contains at least two fields, named field A and field B, each field containing values that are to be used in the query. Then, as discussed above, for each such record, it is necessary to retrieve a value from a field C that is stored in a relational database in a table where the retrieval is based on the values in fields A and B in the record. Such a query can be written as a join of two tables (tables t1 and t2) that are joined on the value of a third field D where the second table holds the parameter value for the field B. Such a query might be written in standard SQL language as:

SELECT t1.C FROM table1 t1 INNER JOIN table2 t2
  ON t1.D=t2.D
  WHERE t1.A=@A AND t2.B=@B This SELECT statement can then be used in a simple program that processes records in a stream by reading the values of fields A and B from each record, performing the query for that record, reading a field (C) from the query result and subsequently writing the contents of field C to the original record. The program can be described by the following "pseudo code":

FOR EACH record IN stream
  BEGIN
    READ A, B FROM record
    EXECUTE query WITH @A=record.A AND @B=record.B
    READ C FROM query
    WRITE C TO record
  END The biggest problem with this approach is that it is not efficient, particularly if the overhead cost of executing the query is small relative to the overhead cost of the query itself (including the RPC overhead, in particular). Furthermore, any work done by the database in the process of executing the query for one record is not leveraged when processing the same query for subsequent records (important examples of such work include sorting that occurs in merge joins, hash tables that are built to perform hash joins and index traversals to read a page in the case of nested loop joins).

SUMMARY OF THE INVENTION

In accordance with the principles of the invention, a more efficient solution to performing the query is to treat the record stream as a sequence of multi-record "chunks" and to execute a single "quasi-batch" query for each chunk. As in the case of the simple parameterized query described above, this technique utilizes a specific table in the database that holds the parameter values and the parameters are bound to the rest of the query by using a database join. However, in this case, the overhead of the query is amortized over multiple records and the database may select query plans that allow it to optimally share the work of executing the query between the records in the chunk.

For example, if the parameterized query plan contains a hash join, the prior art solution will incur the cost of building that hash table for each record in the stream; whereas the corresponding inventive quasi-batch query approach will build the hash table once for each chunk.

Because implementing the inventive quasi-batch technique can consume significant software developer time if implemented on a per-query basis in a stream processing environment, another embodiment uses a framework that automates the implementation of the quasi-batch technique in the stream-processing environment. This framework accepts the parameterized query, identifies inputs and outputs, reads the stream for the parameter values and builds the parameter table, converts the query into an equivalent query that contains a join against the parameter table, performs the equivalent query and inserts the resulting query values into the stream.

In another embodiment, the framework is implemented by a modular stream processing system in which stages in a plurality of stages are interconnected to form a staged system.

BRIEF DESCRIPTION OF THE DRAWINGS

The above and further advantages of the invention may be better understood by referring to the following description in conjunction with the accompanying drawings in which.

DETAILED DESCRIPTION

Figure 1:
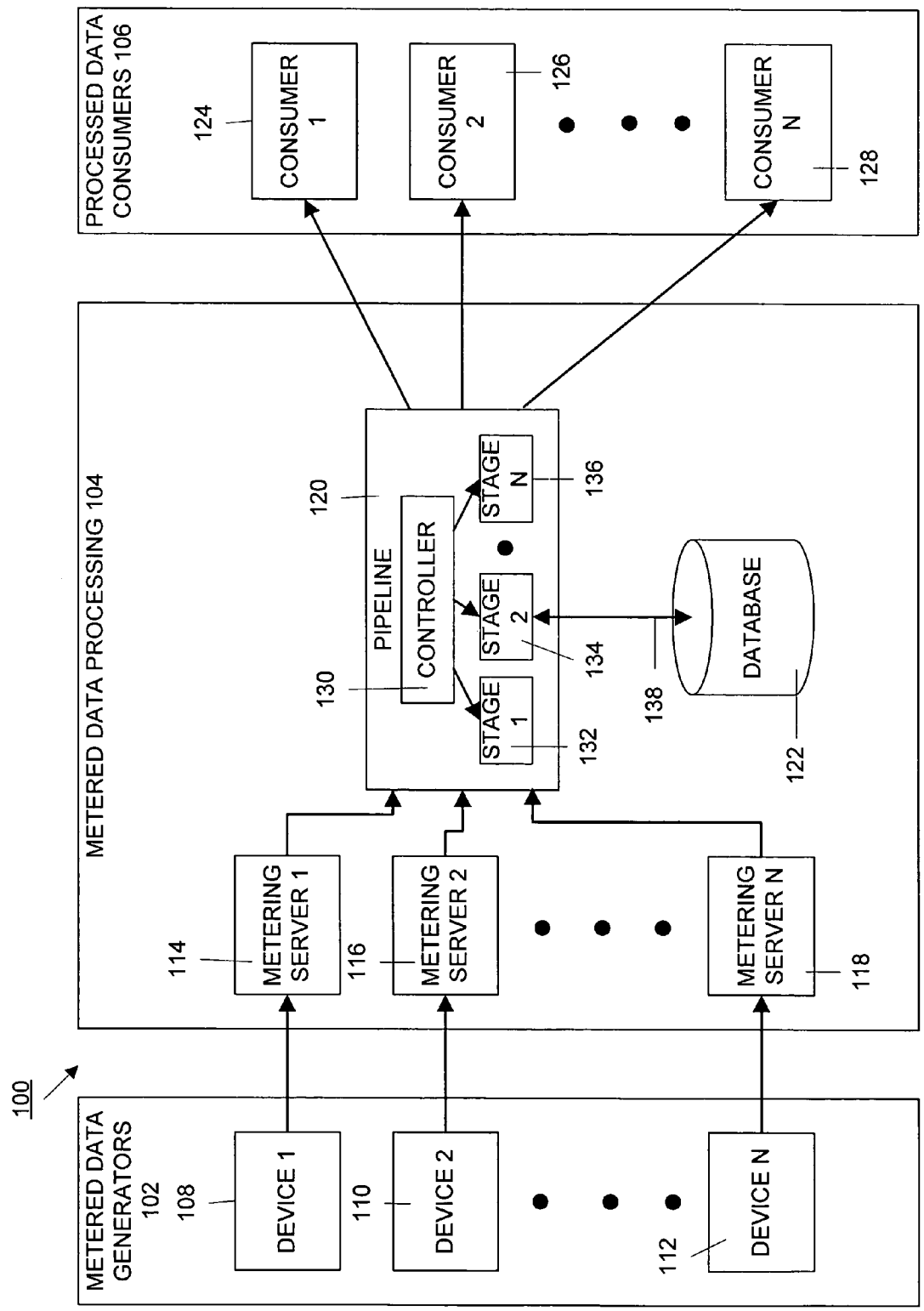
FIG. 1 is a block schematic diagram of a prior art metering and processing system.

FIG. 1 shows an illustrative prior art architecture for a metering and processing system 100 that meters, processes and bills for services, such as usage-based services. The metering and processing system 100 includes a number of metered data generators 102 that meter communications services and generate metered data in a prescribed form; a metered data processing system 104 for processing the metered data to generate useful information regarding communication services usage; and a number of data consumers 106, who require the usage data. Essentially, the usage data calculated from the metered data can include product determinations, tariff determinations, rating, and taxation, as required by the data consumers for a variety of purposes such as display, reporting or billing.

The data generators 102 include a plurality of devices that are designated as device 1 (108), device 2 (110) to device N (112). For example, these devices can include devices, such as audio conference bridges, streaming media servers or telephone services servers. The metered data regarding the use of a particular device by a particular user constitutes what is referred as a "session." The devices 102 are responsible for defining sessions, generating the session objects, adding properties and sub-sessions to the session objects and transmitting them the session objects to the processing system 104.

The processing system 104 can include a plurality of metering servers of which three, designated metering server 1 (114), metering server 2 (116) and metering server N (118) are shown. The metering servers 114-118 are each associated with a different one of the metered data generator devices 108-112. Each metering server receives metered information in the form of session objects from its associated device, persistently stores the session objects, and passes the session objects to the processing pipeline 120.

The pipeline 120 processes the metered session through a sequence of steps or stages that transform the metered data contents of the session objects into the processed usage data. The processed usage data can include a subset of the metered properties of the metered data along with additional properties that are synthesized from the metered properties. The pipeline 120 can also aggregate metered data from related or unrelated transactions. The aggregated data can then be incorporated in reports or in calculations based on aggregate usage of a product, such as, for example, monthly service plans.

The metered data processing system 104 provides the processed usage data to the data consumers 106, preferably in a format specified by the individual subscribers of which three, designated consumer1 (124), consumer 2 (126) and consumer N (128) are shown. Data consumers 124-128 can include service information subscribers such as network or Internet service providers. Each of the data consumers 124-128 can use a user interface to view the service information on request, store the service information in an archival storage for later use, or use the information for billing, provisioning and customer support purposes.

The pipeline 120 is made up of a number of pipeline stages 132, 134 and 136 under the control of a pipeline controller 130. The pipeline stages can be implemented within a single computer, but may also be implemented on multiple, coordinated computers. The exact number of stages and computers used in an implementation, and the number of stages implemented by any single computer, will depend on the application and computer availability; the illustrated implementation merely being exemplary. The pipeline controller 130 can be a computer-executed program stored and executed, for example, on one of the computers or a separate computer (not shown). The stages 132, 134 and 136 are connected together in a data stream between the adjacent stages for passing session objects therebetween, including partially or wholly processed objects. Each of the stages 132, 134 and 136 coordinates the execution of a number of processing stages that are computer-executable objects each containing a process for performing a single function, e.g., a specific portion of a calculation on the metered data. The order of execution of the stages can be determined by a dependency graph or its equivalence and established by the pipeline controller 210. A modular system of this type is described in U.S. Pat. No. 6,377,939 B1.

In a typical processing operation, at least one of the stages or modules will access a database 122 in order to retrieve information. For example, a stage may need to retrieve a rate that depends upon various parameters that are part of a record in the session object. Once the rate is retrieved, it is inserted into the record containing the parameters used to compute it and the updated record is then inserted into the processing stream for further processing. When the database 122 is a conventional relational database, this rate information can be retrieved by using a query as described above.

In accordance with the principles of the invention, the aforementioned query can be converted into a "quasi-batch" query be rewriting the query SELECT statement as a join between a table containing the parameters and the query. Considering the example set forth above, the table (parameter_table) that contains the parameters @A and @B must be first be created and the query must be rewritten as a join against that table as follows:

SELECT t1.C FROM table 1 t1 INNER JOIN table2 t2 ON t1.D=t2.D

INNER JOIN parameter_table p ON t1.A=p.A AND t2.B=p.B

The pseudo code for the "quasi-batch" algorithm becomes:

```
WHILE(stream not ended)
  BEGIN
    READ A,B FROM MANY records
    INSERT MANY records.A, records.B INTO parameter_table
    EXECUTE query
    READ C FROM query
    WRITE C TO MANY records
  END
```

Figure 2A:
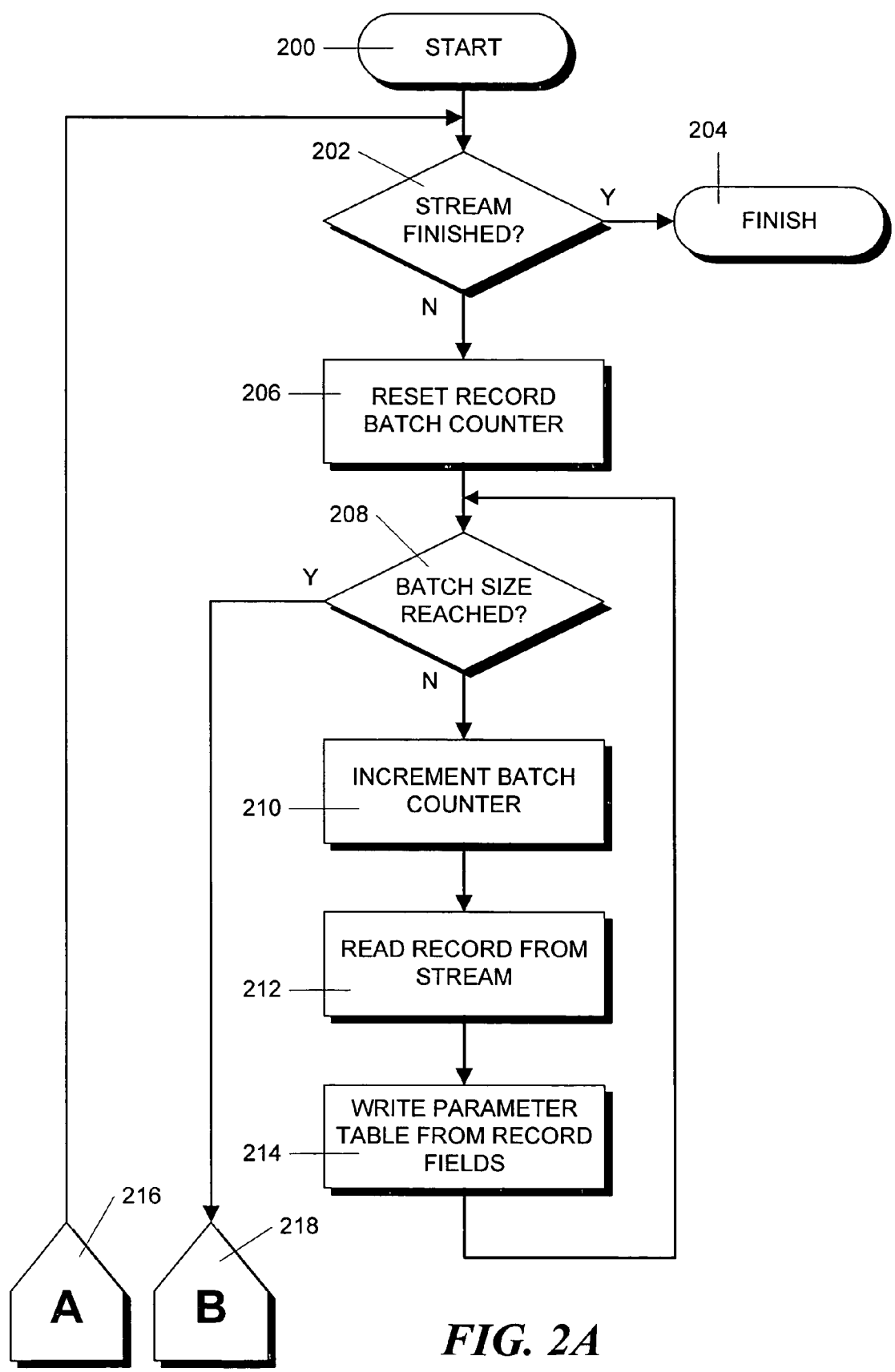
FIGS. 2A and 2B, when placed together, form a flowchart that shows the steps in an illustrative process for processing stream transactions in accordance with the principles of the present invention.
Figure 2B:
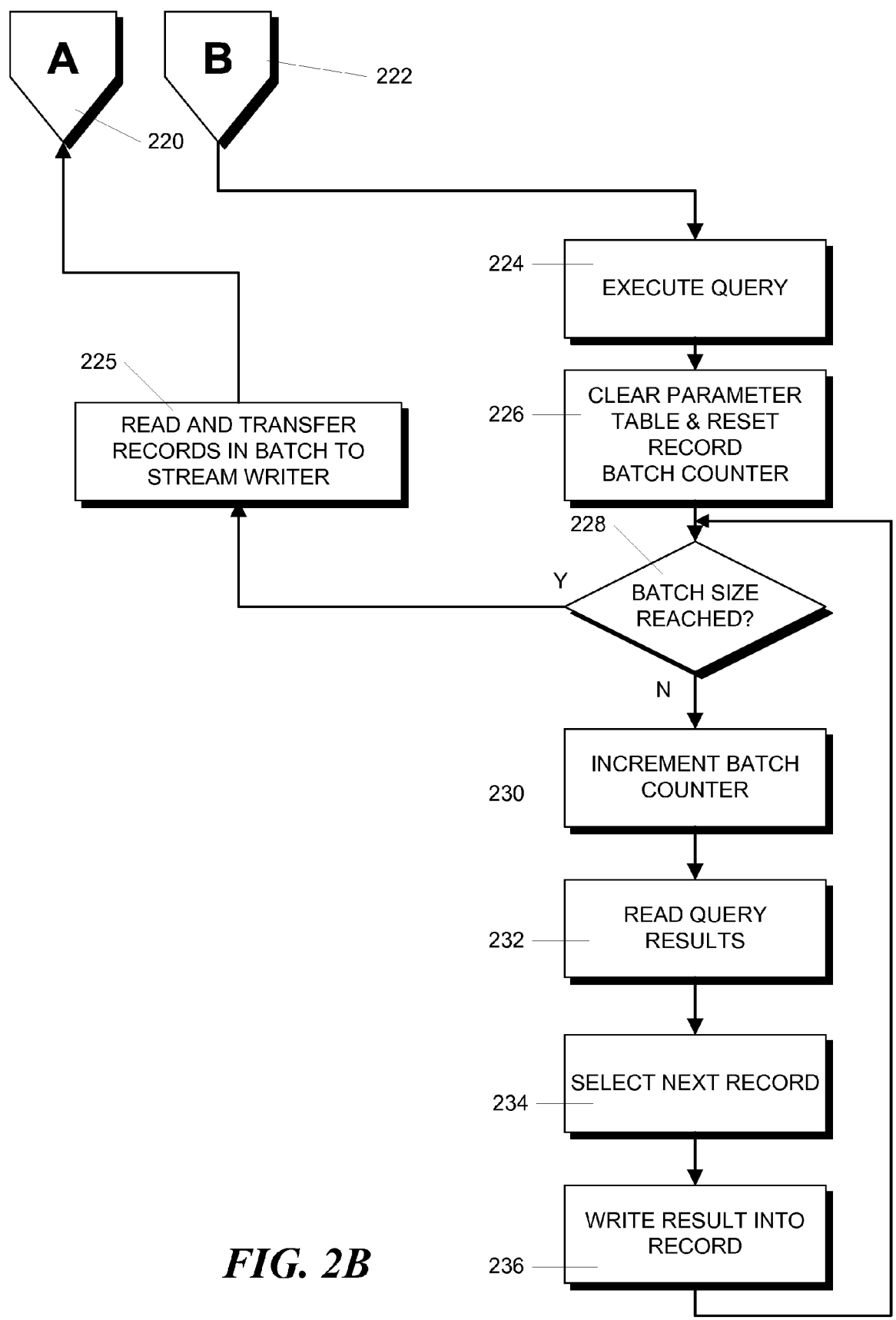
Figure 3:
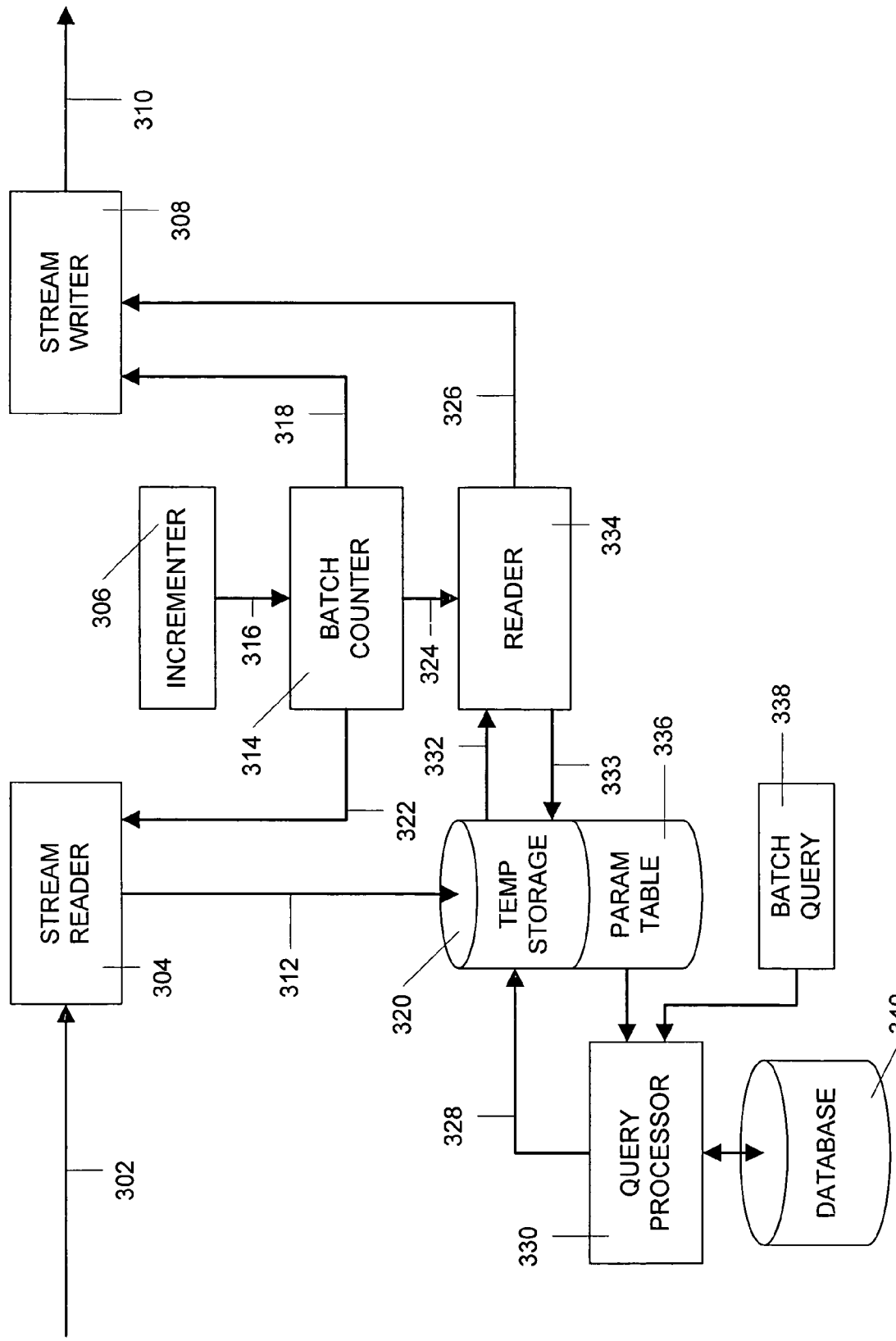
FIG. 3 is a block schematic diagram of apparatus for processing stream transactions in accordance with the principles of the present invention.

The operation of this illustrative method is shown in the flowchart in FIG. 2 and uses the apparatus 300 illustrated in FIG. 3. This process begins in step 200 and proceeds to step 202 where a determination is made whether the incoming data stream 302 has ended and all records have been processed. This determination would normally be made by the stream reader 304. If the stream has ended, then the process finishes in step 204.

If, in step 202, it is determined that there are more records to process, then in step 206, a batch counter 314 is reset. The batch counter 314 determines the number of records that will be processed with each execution of the query. The number of records read per execution of the query is a parameter to the algorithm and may be selected in such a way as to optimize performance of the process.

In step 208, the batch counter 314 makes a determination whether the batch counter has reached the batch size, or the number of records that will be processed per query execution. If not, in step 210, the batch counter 314 is incremented by the incrementer 306 and controls the stream reader 304 to read the next record from the incoming data stream 302 as indicated schematically by arrow 322. Then, in step 214, the parameter table 336 is written using values in selected record fields and the values in the remaining record fields are stored in a temporary storage 320 all as indicated schematically by arrow 312. It may be advantageous to leverage specific technologies in the relational database 122 to perform its work optimally. For example, all of the inputs may be read from the stream into temporary storage and, after a predetermined number of inputs received (for example, when the batch size has been reached as set forth above), the stored inputs can be bulk inserted into the parameter table 336 using non-logged bulk insert interfaces to place the data into the parameter table. For example, in systems that use a Microsoft SQL server, the inputs may be inserted using a conventional Batch Control Program (BCP). Alternatively, in systems that utilize data sessions, such as the pipelined system described above, a set of inputs may already be available as session data. This session data can be bulk inserted into the parameter table using an appropriate bulk insertion interface. The process then returns to step 208 to determine whether the batch size has been reached.

If, in step 208, it is determined by the batch counter 314 that the batch size has been reached, then the process proceeds, via off-page connectors 218 and 222 to step 224 where the query is executed by the query processor 330. Query processor 330 takes as inputs the parameters stored in the parameter table 336 and a batch query 338 (generally in the form of a SELECT statement) that is written as a join of the original query SELECT statement and the parameter table. The query processor 330 uses the query to access the relational database 340 that contains the desired information, for example, the desired rate information. The result set generated by the query is written into the temporary storage 320 by the query processor 330 as indicated schematically by arrow 328.

Next, in step 226, the parameter table is cleared and the batch counter 314 is reset. Then, in step 228, a determination is made by the batch counter 314 whether the batch size has been reached. If not, the batch counter 314 is incremented by the incrementer 306 in step 230 and the batch count is transferred to reader 334 as indicated by arrow 324. Then, in step 232, information for the next record (this information was previously stored as set forth above) is selected in the temporary storage 320 by the reader 334 in accordance with the batch number. In step 234 the query results corresponding to the selected record are read from the temporary storage 320 by the reader 334 as indicated schematically by arrow 332 and in step 236, the query results are written into the selected record as indicated schematically by arrow 333. The process then returns to step 228 to determine if further records remain to be processed in the current batch.

Operation continues in this manner until the batch size is reached as determined in step 228. The process then proceeds to step 225 where the reader reads the records in the current batch and transfers them to the stream writer 308 as indicated schematically by arrow 326. The stream writer 308 then writes the records onto the outgoing stream 310.

The process then proceeds, via off-page connectors 220 and 216 to step 202 to determine whether further records in the incoming stream remain to be processed.

While the quasi-batch technique increases the efficiency of stream processing, the various processing components are specific to the exact query and the data that is present in the stream. Consequently, an ad-hoc implementation of the process is complicated and can consume significant program development time if specialized software must be written for specific data and each different query in the stream processing environment. Accordingly, a more efficient approach used in another embodiment is to create software that automates the implementation of the quasi-batch technique.

Figure 4:
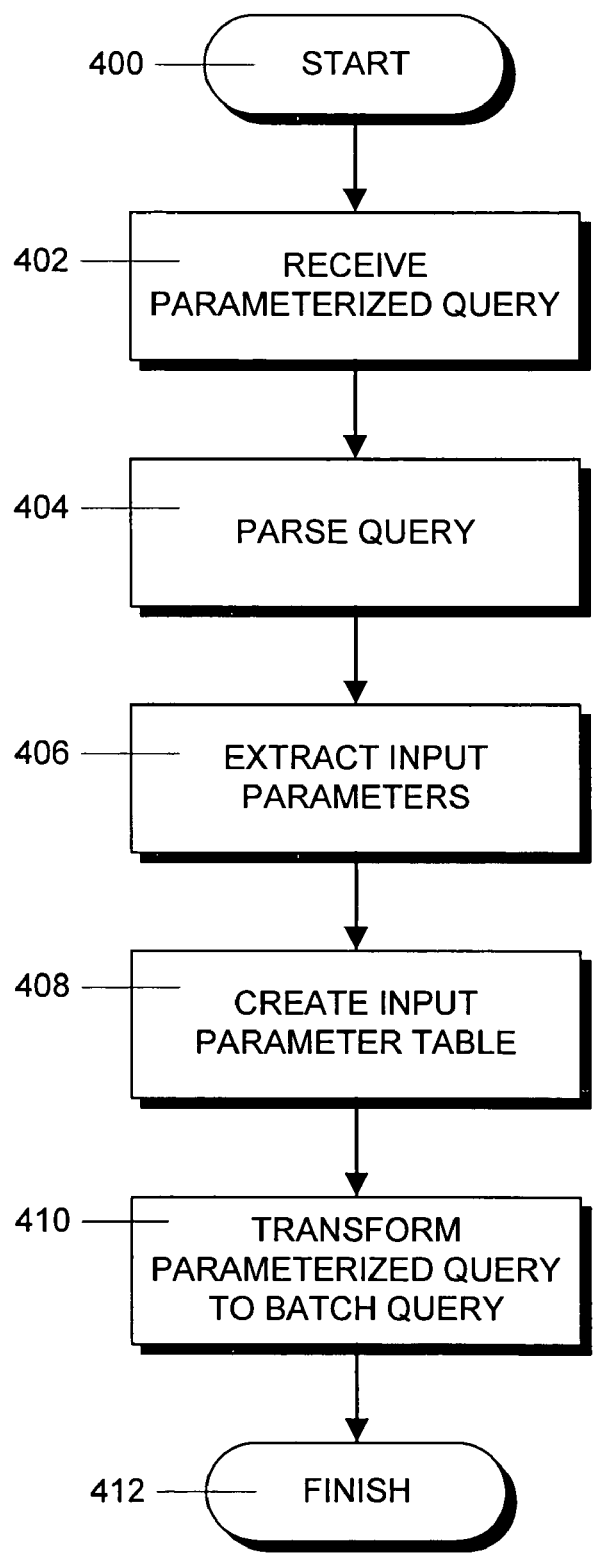
FIG. 4 is a flowchart that illustrates processing of a query provided by a user to automatically convert the query into a quasi-batch query.
Figure 5:
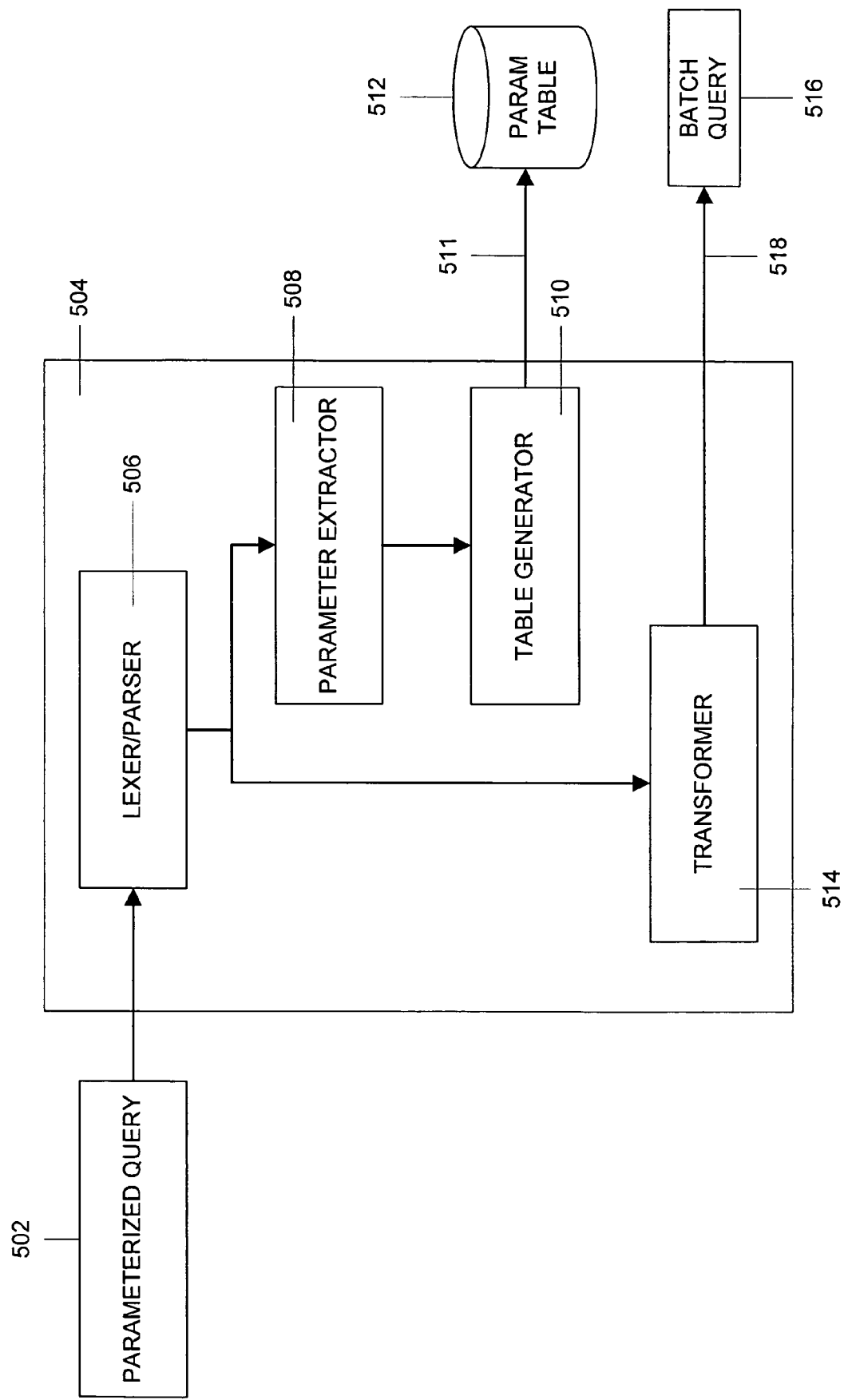
FIG. 5 is a block schematic diagram of apparatus that can perform the process illustrated in FIG. 4.

FIG. 4 is a flowchart that shows an illustrative process that might be performed by the implementation software. This process operates in conjunction with apparatus such as that shown in the block schematic diagram of FIG. 5. The process starts in step 400 and proceeds to step 402 where the parameterized query 502 written by a user is received by the processing system 504. Next, in step 404, the parameterized query is processed by a lexer/parser 506. The lexer part breaks up the query into its constituent components or "tokens". Generally lexing would be performed by using selected characters (such as "whitespace" characters, commas, etc.) as token delimiters to recognize. Repeatedly calling the lexer generates a stream of tokens. The tokens thus extracted from the query are then parsed by the parser. The parser applies a grammatical structure or syntax to the token stream in order to identify operators, operands and parameters, etc. The grammar is specified by the implementation software development based on the particular query language in which the input query is written.

Next, in step 406, the parameter extractor 508 identifies the query input and output parameters by examining the parsed query. In general, these parameters may appear anywhere in the query that an expression may be used (for example, in select lists, where clauses, join criteria and "group by" clauses). As with the parsing, the examination is query language specific and generally assumes that the query has been written with some standard SQL dialect (for example, SQL-92) that has been extended with a syntax to allow for specification of free variables. The query examples listed below assume a query language that uses the syntax "@identifier" for free variables. Thus, the examination of the parsed query tokens would check for tokens of this type. The collection of such parameters found in the query in locations other than the select list, such as where clauses, join criteria and "group by" clauses, comprises the input parameters to the query.

For the purpose of binding the results of the query execution into the stream processing environment, the results of the query as specified in the query select list are mapped to "host" variables created in the stream processor record to hold the results. In particular it is desirable to embed these mappings using extensions to the standard SQL dialect. Such extensions exist in most SQL dialects used by commercial Relational DataBase Management System (RDBMS) vendors. For example, a query written in a typical extended SQL dialect might be:

SELECT t.a INTO @a FROM table t WHERE t.b=@b

The phrase "INTO @a" in this query expresses that the result of the select list is placed into the field "a" of the stream processor record. The parameters bound to items in the select list are the query output parameters. Thus, they can be identified by examining the parsed query to detect tokens following a key word, such as "INTO."

For performance reasons as well as to ensure program correctness it is useful to perform type checking on the quasi-batch query. For output parameters, parameter types can be inferred by preparing or compiling the query in the RDBMS. During this processing, if types of output parameters in the stream processing system are available, type validation can be performed.

For input parameters type inference is generally not possible (and is not supported by most RDBMS). In lieu of type inference it is necessary for type of input parameters to be explicitly declared by the query writer. Illustratively, the above example can be extended with explicit type declarations using a stored procedure statement syntax such as:

CREATE PROCEDURE foo @a INTEGER, @b VARCHAR(256)

AS

SELECT t.a INTO @a FROM table t WHERE t.b=@b

In step 408, the table generator 510 creates a parameter table 512 that will contain the query input parameters for a "batch" of input records. Since the input parameters have already been identified, this table can be created by using appropriate database interface technology, including commands that are specific to a particular database, as indicated schematically by arrow 511. This table will later be populated from the incoming data stream. An illustration of creating such a table in the case of the above example would be to execute the following, or a similar, database command:

CREATE TABLE parameter_table (a INTEGER, parameter_set_id INTEGER)

This command creates a table named parameter_table wherein each row corresponds to one record in the stream. The table has two columns: the first column, named "a", corresponds to input parameter @a and the second column, named "parameter_set_id", corresponds to a record identifier generated by the system that is used to identify an input record in the stream to which the result set will belong. This identifier may, for example, correspond to a record number or some other similar identifier.

Next, in step 410, the transformer 514 transforms the parameterized query 502 into a semantically equivalent batch query 516 that uses one or more joins against the parameter table 512 containing the query input parameters. This transformation is performed using one of a set of predefined rules. The following are illustrative rules for transforming queries.

The first rule transforms a query by simple parameter substitution and is applicable to Select/Project/Join queries. The first core transformation of a query in accordance with this rule is introduction of a CROSS JOIN with the table of parameters. In turn, this involves the replacement of all input parameters with references to the corresponding columns of the table of parameters. The second core transformation of the query is the introduction of the record identifier that marks each result set record with the set of parameter values from which it was generated. For example, if the first rule is applied to the example query:

CREATE PROCEDURE foo @a INTEGER, @b VARCHAR(256)

AS

SELECT t.a INTO @a FROM table t WHERE t.b=@b

The resulting transformed query is:

SELECT t.a, parameter_table.parameter_set_id
    FROM parameter_table, table t
    WHERE t.b=parameter_table.b In the transformed query, the record identifier parameter_set_id from the table parameter_table has been added to the select list so that the stream processor can bind the output values to the correct record. In addition, the table parameter_table has been added to the FROM statement to CROSS JOIN the parameter table. Finally, the input variable @b has been replaced by its value, parameter_table.b in the parameter table.

The same rule will also handle queries that include correlated sub-queries (queries that include clauses, such as EXISTS or IN) in which the sub-query is in the scope of the containing context. Illustratively, such a query might be:

CREATE PROCEDURE foo @a INTEGER, @b VARCHAR(256)

AS

SELECT t.a INTO @a FROM table t WHERE t.b=@b
    AND NOT EXISTS (SELECT 1 FROM table t2 WHERE
        t2.b=@b and t2.a<t.a)

The two core transformations in the aforementioned rule converts this query to:

SELECT t.a, parameter_table.parameter_set_id
    FROM parameter_table, table t
    WHERE t.b=parameter_table.b
    AND NOT EXISTS (SELECT 1 FROM table t2 WHERE
        t2.b=parameter_table.b and t2.a<t.a)

In this transformation, the input parameter @b has been replaced twice, once in the main query and once in the sub-query.

In accordance with another rule, in order to transform a query with multiple variable scopes (for example, a query that includes derived tables or forced join orders) by simple parameter substitution, the aforementioned core transformations are applied multiple times to the query. Then an additional transformation adds an equi-join predicate between the derived table and surrounding query. The following example indicates the transformation of a query containing a derived table. The example input query is:

CREATE PROCEDURE foo @a INTEGER, @b VARCHAR(256) @c INTEGER

AS

SELECT a.col1, foo.col3 INTO @a, @b FROM a INNER JOIN
    (SELECT b.col2, c.col3 FROM b INNER JOIN c ON
        b.col4=c.col4 WHERE
        c.col5=@c) foo ON foo.col2=a.col2

In accordance with this rule, this query is transformed to:

SELECT a.col1, foo.col3, tmp0.parameter_set_id FROM a INNER JOIN
    (SELECT b.col2, c.col3, tmp1.parameter_set_id FROM b
        INNER JOIN c ON
        b.col4=c.col4, parameter_table tmp1 WHERE
            c.col5=tmp1.c) foo ON foo.col2=a.col2, parameter_table tmp0
            WHERE
                foo.parameter_set_id=tmp0.parameter_set_id The last WHERE statement insures that the derived table processes with the correct set of input parameters in the surrounding scope.

A rule for transforming queries that include GROUP BY clauses requires the core transformations discussed above, but in addition, the parameter_set_id record identifier values must be added to the GROUP BY clause. An example of a query including a GROUP BY clause is:

CREATE PROCEDURE foo @a INTEGER, @b VARCHAR(256)

AS

SELECT SUM(t.c) INTO @a FROM table t WHERE t.b=@b

GROUP BY t.a

The rule transforms this query into:

SELECT SUM(t.c), parameter_table.parameter_set_id

FROM parameter_table, table t

WHERE t.b=parameter_table.b

GROUP BY t.a, parameter_table.parameter_set_id

In the transformed query, the record identifier parameter_set_id from the table parameter_table has been added to the select list so that the stream processor can bind the output values to the correct record. In addition, the table parameter_table has been added to the FROM statement to CROSS JOIN the parameter table. Then, the input variable @b has been replaced by its value, parameter_table.b in the parameter table. Finally, the record identifier parameter_set_id has been added to the GROUP BY clause.

A variant of the GROUP BY rule is used for a query in which there is no GROUP BY clause in the source query but there are aggregate functions. In this case, an explicit GROUP BY clause must be added to the transformed query. This is shown in the following example. The input query is as follows:

CREATE PROCEDURE foo @a INTEGER, @b VARCHAR(256)

AS

SELECT SUM(t.c) INTO @a FROM table t WHERE t.b=@b

This is transformed to:

SELECT SUM(t.c), parameter_table.parameter_set_id

FROM parameter_table, table t

WHERE t.b=parameter_table.b

GROUP BY parameter_table.parameter_set_id

In accordance with this transformation rule, the same core transformations are made as in the previous example and, in addition, an explicit GROUP BY clause has been added with the record identifiers.

Another rule handles union queries, such as set union queries identified by the clause UNION and bag union queries identified by the clause UNION ALL. Both of these union queries are processed by applying transformation rules to each component of the union separately. For example, the set union query:

CREATE PROCEDURE foo @a INTEGER, @b VARCHAR(256)

AS

SELECT t1.a INTO @a FROM table1 t1 WHERE t1.b=@b

UNION SELECT t2.a INTO @a FROM table2 t2 WHERE t2.b=@b is transformed by this rule to:

SELECT t1.a, parameter_table.parameter_set_id FROM parameter_table,
  Table1 t1 WHERE t1.b=parameter_table.b UNION SELECT t2.a, parameter_table.parameter_set_id FROM parameter_table,
  table2 t2 WHERE t2.b=parameter_table.b In general, the selection of a particular rule is driven by the syntax and semantics of the parameterized input query. Since the transformer 514 is driven off of the parsed query representation, it is most accurately described as a tree transformer. The transformer 514 uses a tree grammar that describes the abstract syntax of the SQL input query (as represented by the tree structure that is being parsed). Thus, rule selection is accomplished by using tree grammar patterns to identify the structure of the query. When a tree grammar pattern matches a part of the input tree, a semantic action is taken. For the parts of the input query that do not need to be modified, the output of the grammar match simply regenerates the appropriate portion of the input tree. For the parts of the input query that do need to be modified, the output of the grammar match assembles the correct output tree according the rules described above.

In one embodiment, the lexer and parser can be implemented using conventional language recognizer software tools. An example of such a software tool is the ANTLR (ANother Tool for Language Recognition). ANTLR is a language tool that provides a framework for constructing recognizers, compilers, and translators from grammatical descriptions containing Java, C#, or C++ actions. The tool provides support for tree construction, tree walking, and translation. Complete details and downloads are available on the World Wide Web at a website address "antlr.org". This tool can generate both the lexer and the parser. Since most translations require multiple passes over the input text string, the program can also build an intermediate form tree called an abstract syntax tree (ast), which is a structured representation of the input text.

The tree grammar is structured using the ANTLR tool and its variant of regular expressions for trees. The query rewrites are implemented as the "semantic actions" of the tree parser. The following are several sample rules implemented using the ANTLR syntax:

The first rule concerns GROUP BY clauses. For an "outermost" GROUP BY clause according to the rule set forth above, the query must be modified by adding the request to the GROUP BY variables. The following is an ANTLR implementation:

sql92_groupByClause

.

.

.

(TK_GROUP TK_BY sql92_expr (COMMA sql92_expr)*

{ std::string aliasedColumn=getCurrentAlias( )+".requestid";

astFactory.addASTChild(currentAST, #([COMMA, ","]));

astFactory.addASTChild(currentAST, #([ID, aliasedColumn]));

}

}

(TK_HAVING sql92_searchCondition)?)

;

The above example demonstrates part of the GROUP BY processing. The tree parser recognizes the GROUP BY construct and appends the requestid table column to the group by list (using the tree building routines astFactory.addASTChild( ) provided by the ANTLR tool).

The next example illustrates how the table list of the input query (the FROM clause) has the parameter table added. The example uses the same ANTLR routines for manipulating the tree and references some context management of the transformer in order to determine the name of the appropriate parameter table (note that, in some cases, nested contexts require that multiple copies of the parameter table be referenced from within the transformed query; each reference needs a unique alias to make references unambiguous sql92_fromClause

.

.

(TK_FROM     sql92_tableSpecification     (COMMA sql92_tableSpecification)*
{
  std::string alias=getCurrentAlias( )+" ";
  std::string table=getTempTableName( )+" ";
  astFactory.addASTChild(currentAST,     #([COMMA, ","]));
  astFactory.addASTChild(currentAST, #([TABLE_REF, table], ([ALIAS, alias], ##)));
}
)
;

Once the query has been transformed, the process illustrated in FIG. 3 can be started in which the parameter table is filled with a set of values from the data stream, the transformed query is executed and the values merged with the data stream.

In another embodiment, the mechanism for retrieving input parameters from incoming transactions in the stream processing environment and populating the parameter table with the input parameters, the software that creates the parameter table and converts the parameterized query to the batch query and the mechanism for binding the query output result set to the stream processing environment may be implemented as a stage, for example, one of stages 132, 134 and 136, of a pipeline in the aforementioned modularized metering and processing system 100.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device and stored therein. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be distributed as a removable media with accompanying printed or electronic documentation, e.g., shrink wrapped software, pre-loaded with a computer system, e.g, on system ROM or fixed disk, or distributed from a server or electronic bulletin board over a network, e.g., the Internet or World Wide Web and stored on the computer system.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different methods could be used for determining whether partial copy reconstruction should begin. Other aspects, such as the specific process flow, as well as other modifications to the inventive concept are intended to be covered by the appended claims.

What is claimed is:

1. A method for efficiently processing transactions in a streaming transaction processing system, wherein each transaction requires execution of a parameterized query having at least one input taken from that transaction against a relational database, the method comprising:
(a) identifying Inputs and outputs of the parameterized query;
(b) creating a parameter table to hold the parameterized query inputs;
(c) converting the parameterized query into an equivalent query that contains a join against the parameter table;
(d) reading parameter values from transactions in the stream and populating the parameter table with input values read from the transactions, and
(e) applying the equivalent query to the relational database to generate a result set; and
(f) inserting output values from the result set into the transactions.

2. The method of claim 1 wherein step (a) comprises:
(a1) lexing the parameterized query to generate a plurality of tokens; and
(a2) parsing the tokens to identify query inputs and query outputs.

3. The method of claim 2 wherein step (b) comprises using an interface to the relational database to create the parameter table based on the identified query inputs.

4. The method of claim 1 wherein step (c) comprises using a set of rules to convert the parameterized query into an equivalent query.

5. The method of claim 4 wherein step (c) comprises:
(c1) modeling the parameterized query as a tree structure;
(c2) specifying a tree grammar that describes the tree structure; and
(c3) selecting at least one rule in the set of rules based on a match between the parameterized query and the tree grammar to convert the parameterized query.

6. The method of claim 1 wherein step (d) comprises populating the parameter table using a bulk insert interface of the relational database.

7. The method of claim 6 wherein the bulk insert interface is not logged.

8. The method of claim 6 wherein the parameter table has a predetermined size and wherein step (d) comprises populating the parameter table until the table becomes filled.

9. The method of claim 8 wherein step (e) comprises executing the equivalent query once each time the parameter table becomes filled.

10. The method of claim 9 further comprising:
(f) clearing the parameter table after the equivalent query has been executed; and
(g) repeating steps (d), (e) and (f) until all transactions have been processed.

11. Apparatus for efficiently processing transactions in a streaming transaction processing system having a memory wherein each transaction requires execution of a parameterized query having at least one input taken from that transaction against a relational database, the apparatus comprising:
- a mechanism that identifies inputs and outputs of the parameterized query;
- a table generator that creates a parameter table in the memory to hold the parameterized query inputs;
- a transformer that converts the parameterized query into an equivalent query that is in the memory and contains a join against the parameter table;
- a mechanism that reads parameter values from transactions in the stream and populates the parameter table with input values read from the transactions; and
- a mechanism that applies the equivalent query to the relational database to generate a result set; and
- a stream writer that inserts output values from the result set into the transactions.

12. The apparatus of claim 11 wherein the mechanism that identifies inputs and outputs comprises:
- a lexer that processes the parameterized query to generate a plurality of tokens; and
- a parser that examines the tokens to identify query inputs and query outputs.

13. The apparatus of claim 12 wherein the table generator comprises a mechanism that uses an interface to the relational database to create the parameter table based on the identified query inputs.

14. The apparatus of claim 11 wherein the transformer comprises a rule-based mechanism that uses a set of rules to convert the parameterized query into an equivalent query.

15. The apparatus of claim 14 wherein the rule-based mechanism comprises:
- means for modeling the parameterized query as a tree structure;
- means for specifying a tree grammar that describes the tree structure; and
- means for selecting at least one rule in the set of rules based on a match between the parameterized query and the tree grammar to convert the parameterized query.

16. The apparatus of claim 11 wherein the mechanism that populates the parameter table comprises means for populating the parameter table using a bulk insert interface of the relational database.

17. The apparatus of claim 16 wherein the bulk insert interface is not logged.

18. The apparatus of claim 16 wherein the parameter table has a predetermined size and wherein the mechanism for populating the parameter table comprises means for populating the parameter table until the table becomes filled.

19. The apparatus of claim 18 wherein the mechanism that applies the equivalent query to the relational database comprises means for executing the equivalent query once each time the parameter table becomes filled.

20. The apparatus of claim 19 further comprising:
- means for clearing the parameter table after the equivalent query has been executed; and
  - processing transactions with the transformer, the mechanism that populates the parameter table with input values read from the transactions and the mechanism that applies the equivalent query to the relational database to until all transactions have been processed.

21. Apparatus for efficiently processing transactions in a streaming transaction processing system having a memory wherein each transaction requires execution of a parameterized query having at least one input taken from that transaction against a relational database, the apparatus comprising:
- means for Identifying Inputs and outputs of the parameterized query;
- means for creating a parameter table in the memory to hold the parameterized query inputs;
- means for converting the parameterized query into an equivalent query that is In the memory and contains a join against the parameter table;
- means for reading parameter values from transactions in the stream and populates the parameter table with input values read from the transactions; and
- means for applying the equivalent query to the relational database to generate a result set; and
- means for inserting output values from the result set Into the transactions.

22. The apparatus of claim 21 wherein the means for identifying inputs and outputs comprises:
- means for processing the parameterized query to generate a plurality of tokens; and
- means for examining the tokens to identify query inputs and query outputs.

23. The apparatus of claim 22 wherein the means for creating the parameter table comprises means for using an interface to the relational database to create the parameter table based on the identified query inputs.

24. The apparatus of claim 21 wherein the means for converting the parameterized query comprises means for using a set of rules to convert the parameterized query into an equivalent query.

25. A pipelined system for efficiently processing transactions in a streaming transaction processing system having a memory wherein each transaction requires execution of a parameterized query having at least one input taken from that transaction against a relational database, the system comprising:
- a plurality of processing stages;
- a pipeline controller that determines the order of execution of the pipeline stages;
  - wherein at least one pipeline stage includes:
    - a mechanism that identifies inputs and outputs of the parameterized query;
    - a table generator that creates a parameter table in the memory to hold the parameterized query inputs;
    - a transformer that converts the parameterized query into an equivalent query that is in the memory and contains a join against the parameter table;
    - a mechanism that reads parameter values from transactions in the stream and populates the parameter table with input values read from the transactions;
    - a mechanism that applies the equivalent query to the relational database to generate a result set; and
    - a mechanism that inserts output values from the result set into the transactions.

26. A computer program product for efficiently processing transactions in a streaming transaction processing system, wherein each transaction requires execution of a parameterized query having at least one input taken from that transaction against a relational database, the computer program product comprising a tangible computer usable medium having computer readable program code thereon, including:
- program code for identifying inputs and outputs of the parameterized query;
- program code for creating a parameter table to hold the parameterized query inputs;

program code for converting the parameterized query into an equivalent query that contains a join against the parameter table;

program code for reading parameter values from transactions in the stream and populates the parameter table with input values read from the transactions;

program code for applying the equivalent query to the relational database to generate a result set; and program code for inserting output values from the result set into the transactions.

* * * * *

UNITED STATES PATENT AND TRADEMARK OFFICE
CERTIFICATE OF CORRECTION

| | |
|---|---|
| PATENT NO. | : 7,310,638 B1 |
| APPLICATION NO. | : 10/959737 |
| DATED | : December 18, 2007 |
| INVENTOR(S) | : Blair |

Page 1 of 1

It is certified that error appears in the above-identified patent and that said Letters Patent is hereby corrected as shown below:

On the title page, item (56), under "OTHER PUBLICATIONS", in Column 2, Line 1, delete "Extensibe" and insert -- Extensible --, therefor.

In the Specification

In Column 11, Line 11, delete "(note" and insert -- note --, therefor.

In the Claims

In Column 12, Line 21, in Claim 1, delete "Inputs" and insert -- inputs --, therefor.

In Column 13, Line 1, in Claim 11, delete "Apparatus" and insert -- An apparatus --, therefor.

In Column 13, Line 66, in Claim 21, delete "Apparatus" and insert -- An apparatus --, therefor.

In Column 14, Line 5, in Claim 21, delete "Identifying Inputs" and insert -- identifying inputs --, therefor.

In Column 14, Line 10, in Claim 21, delete "In" and insert -- in --, therefor.

In Column 14, Line 17, in Claim 21, delete "Into" and insert -- into --, therefor.

Signed and Sealed this
Twenty-fifth Day of August, 2015

Michelle K. Lee
*Director of the United States Patent and Trademark Office*